United States Patent [19]

Ishii et al.

[11] Patent Number: 4,607,950

[45] Date of Patent: Aug. 26, 1986

[54] MARK DETECTION APPARATUS FOR A MICRO-ROLL FILM

[75] Inventors: Kenjiro Ishii; Masaharu Aragaki; Osami Kato; Masato Higashi, all of Kanagawa, Japan

[73] Assignee: Minolta Camera Kabushiki Kaisha, Osaka, Japan

[21] Appl. No.: 726,874

[22] Filed: Apr. 25, 1985

Related U.S. Application Data

[63] Continuation-in-part of Ser. No. 654,353, Sep. 25, 1984, abandoned.

[51] Int. Cl.⁴ .............................................. G03B 27/52
[52] U.S. Cl. ...................................... 355/41; 250/557; 250/570; 353/26 A
[58] Field of Search .......................... 355/41, 45, 40; 353/26 R, 26 A; 250/570, 557, 560, 561

[56] References Cited

U.S. PATENT DOCUMENTS 3,744,890  7/1973  Suzuki et al. .................. 353/26 A
4,514,641  4/1985  Tanaka et al. .................. 250/570

FOREIGN PATENT DOCUMENTS 56-30893  7/1981  Japan .

Primary Examiner—L. T. Hix
Assistant Examiner—Della J. Rutledge
Attorney, Agent, or Firm—Wolder, Gross & Yavner

[57] ABSTRACT

A mark detecting apparatus for a micro-roll film including one photoelectric element for detecting marks of different sizes provided on one edge portion of a micro-roll film for respective frames of the film, a pulse generating unit which generates pulses by radial slits formed in a disc adapted to be driven for rotation by contacting the micro-roll film, and a mark size judging circuit which counts the pulses produced from the pulse generating unit during the photoelectric element for the mark is detecting the mark of the film or judging the size of the mark by the counted value.

4 Claims, 8 Drawing Figures

MARK DETECTION APPARATUS FOR A MICRO-ROLL FILM

This is a continuation-in-part application of patent application Ser. No. 654,353, filed on Sept. 25, 1984, now abandoned.

BACKGROUND OF THE INVENTION

1. Technical Field

The present invention generally relates to an information searching system and more particularly, to a mark detecting apparatus for detecting marks recorded on frames of a micro-roll film for use in a reader/printer or the like.

2. Prior Art

In a reader/printer or the like, it is so arranged that retrieval of information recorded frames of a micro-roll film is effected for re-utilization of the information. For a system of such retrieval, there has conventionally been employed an arrangement in which marks (blip marks or document marks) having a density different from that of a film base are photographically formed in a non-image portion at a side edge portion of the film in positions corresponding to respective frames, so that by counting such marks with photoelectric and electric counting means as the film is driven, the film is stopped when the count value coincides with the desired frame number, thereby to retrieve the necessary information recorded frame.

In FIGS. 1 and 2, there is shown one example of the mark detecting apparatus of the above described type. In a mark detecting mechanism thereof shown in FIG. 1, a film 1 is arranged to be displaceable in any of a forward direction or a reverse direciton, while marks 2 are photographically recorded on a non-image portion at one side edge portion of the film 1 so as to correspond in position to respective frames 3. Above and adjacent to the one side edge of the film 1 and in position confronting a passage of the marks 2, a pair of photoelectric elements 4 and 5 are provided side by side to be aligned with the direction of movement of the film 1, whereby light projected onto the photoelectric elements 4 and 5 from a light source 6 through the film 1 is intermittently intercepted due to passing of the marks 2.

In FIG. 2, one example of a circuit for processing signals obtained by the mark detecting mechanism of FIG. 1 is shown, in which circuit, photo-transistors are employed respectively for the photoelectric elements 4 and 5. Each of the photo-transistors has its collector connected to a power source +V, with respective emitters thereof being grounded through variable resistors 7 and 8. The emitter of the photo-transistor constituting the photoelectric element 4 is connected to a non-inverting input terminal of a voltage comparator 9 at a subsequent stage, while the emitter of the photo-transistor constituting the photoelectric element 5 is coupled to an inverting input terminal of another voltage comparator 10. A variable resistor 11 is intended to apply a reference voltage for the voltage comparators 9 and 10, and its one end is connected to the power source +V, the other end thereof to the ground, and its sliding terminal is coupled to the inverting input terminal of the voltage comparator 9 and the non-inverting input terminal of the voltage comparator 10.

Thus, in the voltage comparator 9, an L signal (low voltage signal) is provided when the light incident upon the photoelectric element 4 is intercepted by the mark 2, while on the contrary, an H signal (high voltage signal) is output when the light is permitted to be incident upon the photoelectric element 4. On the other hand, in the voltage comparator 10, an H signal is output when the light incident upon the photoelectric element 5 is intercepted by the mark 2, while an L signal is produced when the light is allowed to be incident upon the photoelectric element 5. At a stage subsequent to the voltage comparator 9, there are provided side by side a signal processing section 13a for detecting a falling or negative edge of the output of the comparator 9, and a signal processing section 13b for detecting a rising or positive edge of said output. The signal processing section 13a is constituted by a differentiation circuit including a capacitor 14, a pull-up resistor 15, and a diode 16 for protection against excessive voltages, and a Schmitt inverter buffer 17 at a subsequent stage, and produces pulses only when the output of said voltage comparator 9 is varied from the H level to the L level. Meanwhile, the signal processing section 13b is constituted by a differentiation circuit including a capacitor 18, a pull-down resistor 19 and a diode 20 for protection against inverse voltage, and a Schmitt buffer 21 at a subsequent stage, and produces pulses only when the output of the voltage comparator 9 is varied from the L level to the H level. The output terminal of the Schmitt inverter buffer 17 is connected to one input terminal 22a of an AND gate 22 at a subsequent stage, and a logical product of the output of the voltage comparator 10 connected to the other input terminal 22b and the output of the Schmitt inverter buffer 17 is obtained by said AND gate 22. On the other hand, the output terminal of the Schmitt buffer 21 is connected to one input terminal 23a of another AND gate 23, and a logical product of the output of the voltage comparator 10 connected to the other input terminal 23b and the output of the Schmidt buffer 21 is obtained at said AND gate 23.

In the known mark detecting apparatus as described so far, when the film 1 is displaced in the forward direction with respect to the interception of light incident upon the photoelectric elements 4 and 5 following the movement of the mark 2, the photoelectric element 4 is first intercepted, and then, the photoelectric element 5 is intercepted. In the states of mark detection as described above, the output of the voltage comparator 9 becomes the L signal, while that of the voltage comparator 10 is rendered to be the H signal, and therefore, in the detecting order as described above, the output of the AND gate 23 which provides the logical product of the output of the signal processing section 13b which produces the pulses at the positive edge of the output of the voltage comparator 9 and the output of the voltage comparator 10, becomes the H signal, whereby the mark detection in the case where the film 1 runs in the forward direction can be effected. It is to be noted here that since the output of the signal processing section 13a which produces the pulses at the negative edge of the voltage comparator 9 and the output of the voltage comparator 10 are not overlapped with each other in terms of time, no H signals are produced from the AND gate 22.

Similarly, in the case where the film 1 is caused to run in the reverse direction, the photoelectric element 5 is first intercepted, with a subsequent interception of the photoelectric element 4 in the order or light interception by the mark 2, and therefore, the output of the AND gate 22 which takes the logical product of the output of the signal processing section 13a and the output of the voltage comparator 10, becomes the H signal, whereby the mark detection in the case where the film 1 runs in the reverse direction may be achieved.

Thus, by counting the pulses produced from said AND gates 22 and 23, the desired frame can be retrieved.

As described so far, in the mark detecting apparatus of such a system, a plurality of photoelectric elements are required for the mark detection. In the foregoing example, the number of the photoelectric elements is two pieces, since the mark is limited to one kind, but if the kind of the mark is increased as in an example shown in FIGS. 3 and 4, it becomes necessary to employ a larger number of photoelectric elements.

However, the photoelectric conversion efficiency of the photoelectric elements tends to be largely scattered or deviated in the manufacture even in the same kind, and in the case where the plurality of photoelectric elements are to be employed as described above, it becomes necessary to provide adjusting means for each photoelectric element in order to bring the detecting performance between the photoelectric elements into agreement. In the circuit of FIG. 2, the variable resistors 7 and 8 are incorporated as said adjusting means.

On the other hands, there are provided various kinds of films, representative ones of which are the silver salt type, diazo type, vesicular type, etc., each different in the base density. Besides such a difference, since the image density to be recorded differs to a large extent according to the kinds of films, it is required to adjust the detecting performance of the photoelectric element to correspond to the kinds of films, and the adjusting work therefor includes a troublesome procedure. Especially, in the case of the vesicular type film, although a sufficient contrast may be obtained in a position where the image recorded on the film is projected through a lens and forms an image, the contrast becomes generally equal to a difference of a diffused density in a position very close to the film, and the contrast is extremely small. Accordingly, for the mark detection of such a film, it is necessary to effect the adjustment of the output performance of the photoelectric element still more carefully, with the adjusting work involved therefor becoming more and ,more troublesome.

Meanwhile, in the case where a light source for projecting the image of the film onto a screen or a light source for obtaining a hard copy is commonly used also for the light source for the mark detection, the intensity of the light source is varied so that the brightness at the image forming surface is not changed when the reproducing magnification of the image is to be altered, and therefore, in this case also, it is necessary to adjust the output performance with respect to each of the plurality of photoelectric elements.

FIGS. 3 and 4 show a mark detecting apparatus so arranged that three kinds of marks with different lengths, i.e. a small mark $2's$, a medium mark $2'm$, and a large mark $2'l$, can be detected through employment of the detecting system as described above. As shown in FIG. 3, in this retrieval apparatus, four photoelectric elements 24a, 24b, 24c and 24d are arranged side by side so as to be aligned in the direction of running of the film, whereby the small mark $2's$ is detected by the combination of the photoelectric elements 24a and 24b, and the photoelectric element 24c together with the photoelectric elements 25a and 24b is employed for the detection of the middle mark $2'm$, and the photoelectric element 24d is used for the detection of the large mark $2'l$ in combination with the photoelectric elements 24a, 24b and 24c. The photoelectric elements 24a and 24b are disposed in positions neighboring each other, so that they are simultaneously covered by the small mark $2's$. The distance between the photoelectric elements 24a and 24c is made longer than the length of the small mark $2's$, and shorter than the length of the large mark $2'l$, and thus, the photoelectric elements 24a and 24c are adapted to be simultaneously covered by the medium mark $2'm$. The distance between the photoelectric elements 24a and 24d is set to be longer than the length of the medium mark $2'm$ so that the photoelectric elements 24a and 24d are simultaneously covered by the large mark $2'l$.

In FIG. 4 showing one example of the circuit for processing the mark detection signals obtained by the photoelectric elements 24a, 24b, 24c and 24d of FIG. 3, a circuit section 25 surrounded by a one dot chain line has a construction generally similar to that of FIG. 2 described earlier, and includes signal processing stages 26a and 26b respectively for detecting the positive edge and negative edge of the mark detection signal (which becomes the H level signal) by the photoelectric element 24a. When the marks pass the portion where the photoelectric elements 24a and 24b are provided in the forward direction, pulses corresponding thereto are produced from an AND gate 27, while on the contrary, when the marks pass there in the reverse direction, pulses corresponding thereto are produced from an AND gate 28. Here, in addition to the above circuit section 25, there are provided AND gates 29 and 30 which invert the mark detection signal of the photoelectric element 24c, and obtain a logical product of this inverted signal and the output of said AND gates 27 and 28, AND gates 31 and 32 which obtain a logical product of the detection signal of the photoelectric element 24c, the outputs of the AND gates 27 and 28, and the inverted output of the photoelectric element 24d, and AND gates 33 and 34 which obtain a logical product of the outputs of the photoelectric elements 24c and 24d and the outputs of the AND gates 27 and 28. By the above arrangement, from the AND gate 29, a small mark forward direction pulse, i.e. a pulse equivalent to the detection of the small mark $2's$ moving in the forward direction, may be obtained. Similarly, there are respectively obtained the small mark reverse direction pulse from the AND gate 30, medium mark forward direction pulse from the AND gate 31, medium mark reverse direction pulse from the AND gate 32, large mark forward direction pulse from the AND gate 33, and large mark reverse direction pulse from the AND gate 34.

As described earlier, it will be seen from the above example that if arranged as follows, the adjustment of the output performance for the photoelectric elements extends as far as four positions, with consequent troublesome procedures for the adjusting work.

SUMMARY OF THE INVENTION

Therefore, it is a primary object of the present invention to provide an improved mark detecting apparatus of information recording frame for a micro-roll film, which is easy in adjustment and simple in construction, and capable of detecting, through identification, a plurality of kinds of frame retrieving marks marked on a film by one mark detecting element so as to eliminate disadvantages in the conventional mark detecting apparatus as stated above.

In order to accomplish this and other objects, according to one preferred embodiment of the present invention, there is provided a novel mark detecting apparatus for measuring lengths of indicator marks of different lengths provided on respective frames of an advancing micro-roll film. The mark detecting apparatus comprises first means including a single photo responsive element sensing said indicator marks at a predetermined location for generating mark detecting signals of durations corresponding to the time of passage of respective marks past said location, second means for generating successive pulses corresponding to equal increment advances of the film, and third means for counting said pulses during the duration of respective mark detecting signals as indications of the lengths of respective marks.

DESCRIPTION OF THE PREFERRED EMBODIMENT

Referring now to FIGS. 5 through 8, a mark detecting apparatus for a micro-roll film according to one preferred embodiment of the present invention will be described hereinbelow.

Figure 1:
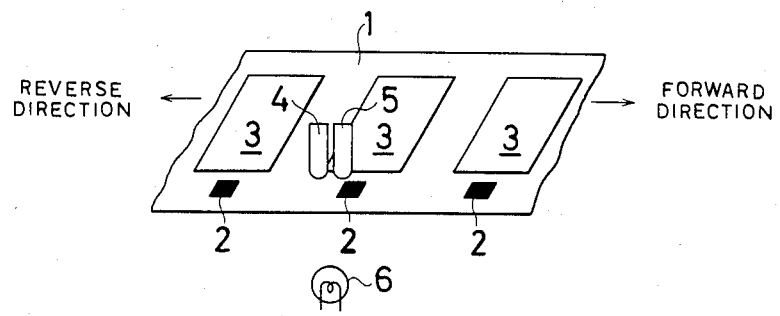
FIG. 1 is a schematic diagram in a perspective view showing a conventional mark detecting mechanism.
Figure 2:
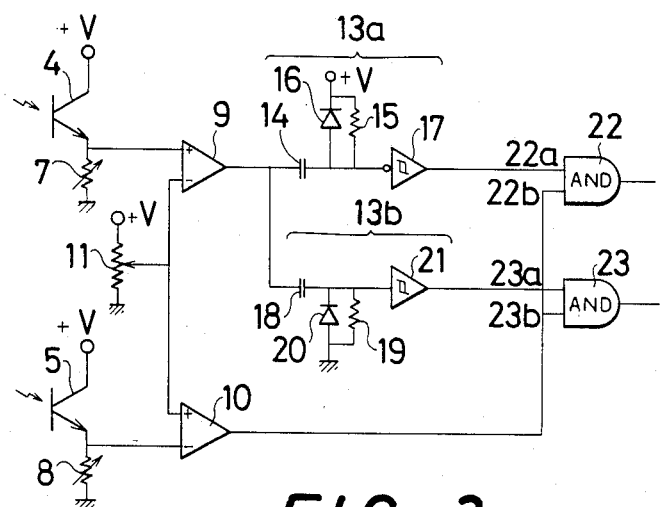
FIG. 2 is a circuit diagram showing a signal processing section in a conventional example.
Figure 3:
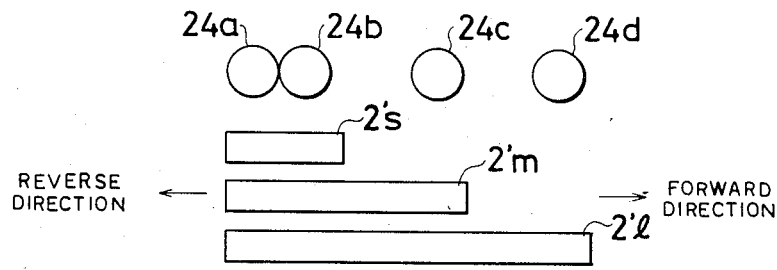
FIG. 3 is a schematic diagram showing the relation between the disposition of detecting elements and marks in the case where a plurality of kinds of marks are to be detected by a conventional system.
Figure 4:
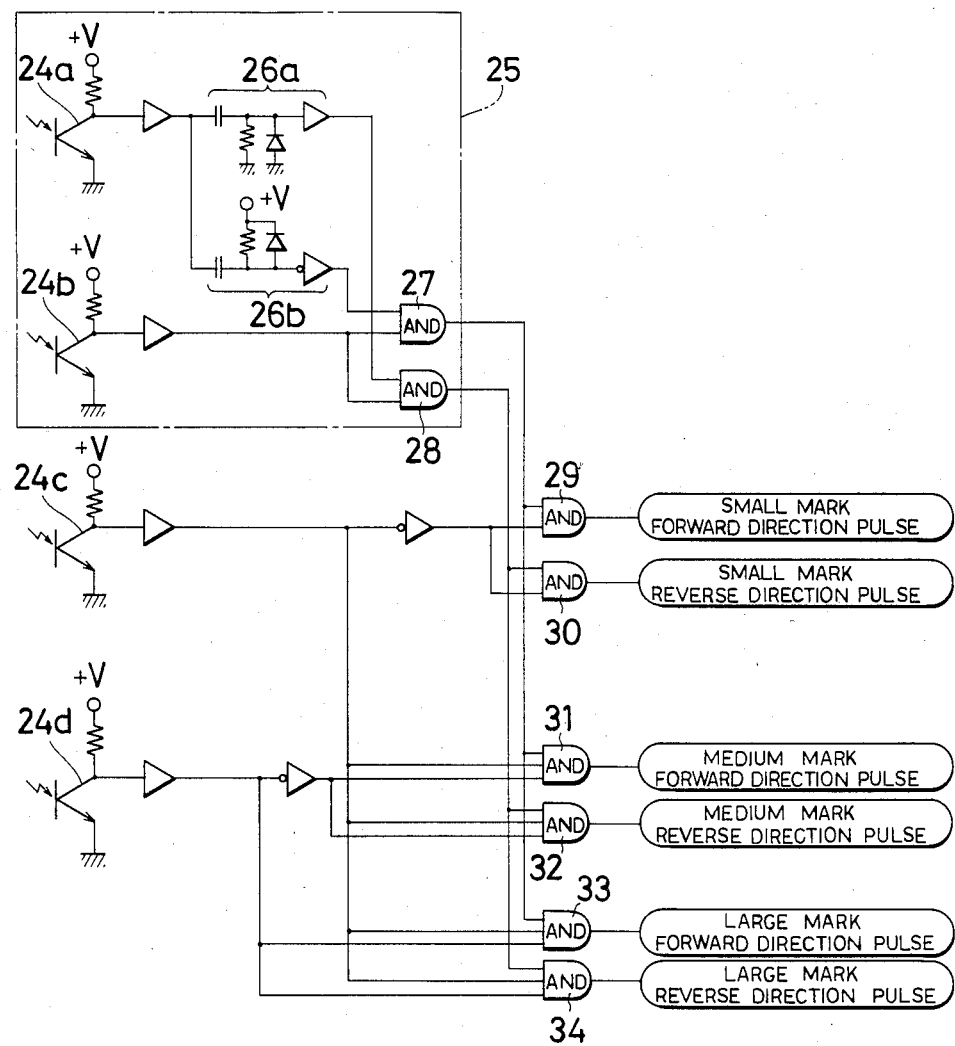
FIG. 4 is a circuit diagram showing one example of a processing section of output signals from the detecting elements arranged as in FIG. 3.
Figure 5:
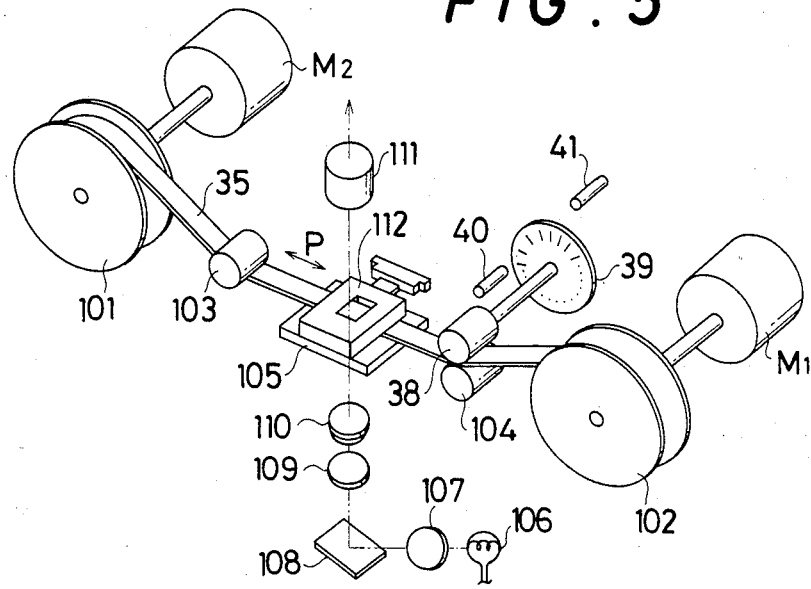
FIG. 5 is a perspective view showing the construction according to one preferred embodiment of the present invention.

In FIG. 5, there is shown a micro-roll film 35, having at its one edge portion, a plurality of marks (FIG. 6) corresponding to respective frames.

Means for causing the micro-roll film 35 to run is constituted by motors M1 and M2 respectively connected to a supply reel 101 and a take-up reel 102, and based on the driving by these motors M1 and M2, the micro-roll film 35 is selectively moved in the supply direction or take-up direction indicated by arrows P through guide rollers 103, 104 and 38.

At a projecting position in the course of the film travelling path, a presser glass 105 is disposed, and there is constituted an optical system so that light from a light source 106 is transmitted through the micro-roll film 35 on the presser glass 105 via a condenser lens 107, a reflecting mirror 108, and condenser lenses 109 and 110 so as to project the image of the film onto a screen (not shown) provided at its upper portion via a projecting lens 111.

Figure 6:
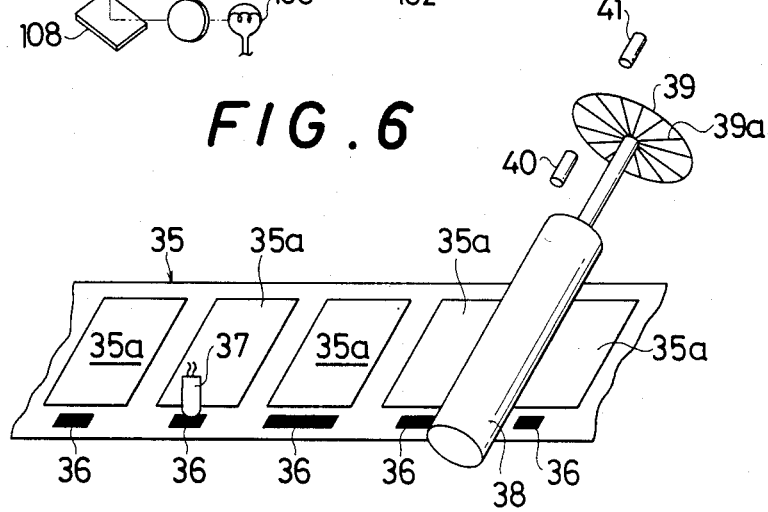
FIG. 6 is a perspective view showing the construction in the vicinity of a film running path of the embodiment.
Figure 8:
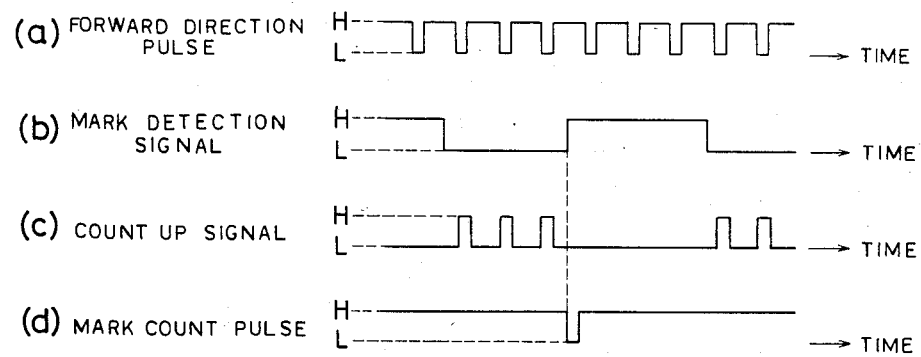
FIG. 8 is a timing chart for the circuit of FIG. 7.

As shown in FIG. 6, a mark detecting means 112 is provided with one photoelectric element 37 as a mark detecting element, and arranged to detect the mark corresponding to the frame of the micro-roll film 35 which has arrived at the projecting position. The output of said photoelectric element becomes "L" level upon interception of the incident light by the passing mark 36 as shown in FIG. 8 (b), and this serves as a mark detection signal.

The pulse generating means includes a driven roll 38 rotatably contacting the film 35 in the course of a film transfer path, a disc 39 formed with many radial slits 39a and fixed to one end of the driven roll 38, and a set of a light emitting element 40 and a light receiving element 41 arranged to confront each other through said disc 39, thereby to obtain pulses as the film 35 is caused to run. By the logical product of the above pulses and driving signal (to be described later) of the motors M1 and M2, the forward direction pulse is differentiated from the reverse direction pulse. Moreover, the above pulse may also be used as a signal for detecting the film feeding length. The forward direction pulse (the waveform of which is shown by a symbol (a) in FIG. 8) is the pulse produced following running of the film 35 in the forward direction. The cycle thereof corresponds to the cycle of the intermittent light projection when the many radial slits 39a provided in the disc 39 pass between the light emitting element 40 and the light receiving element 41. The reverse direction pulse is the pulse produced following running of the film 35 in the reverse direction, and the cycle thereof is equal to that of the forward direction pulse.

Figure 7:
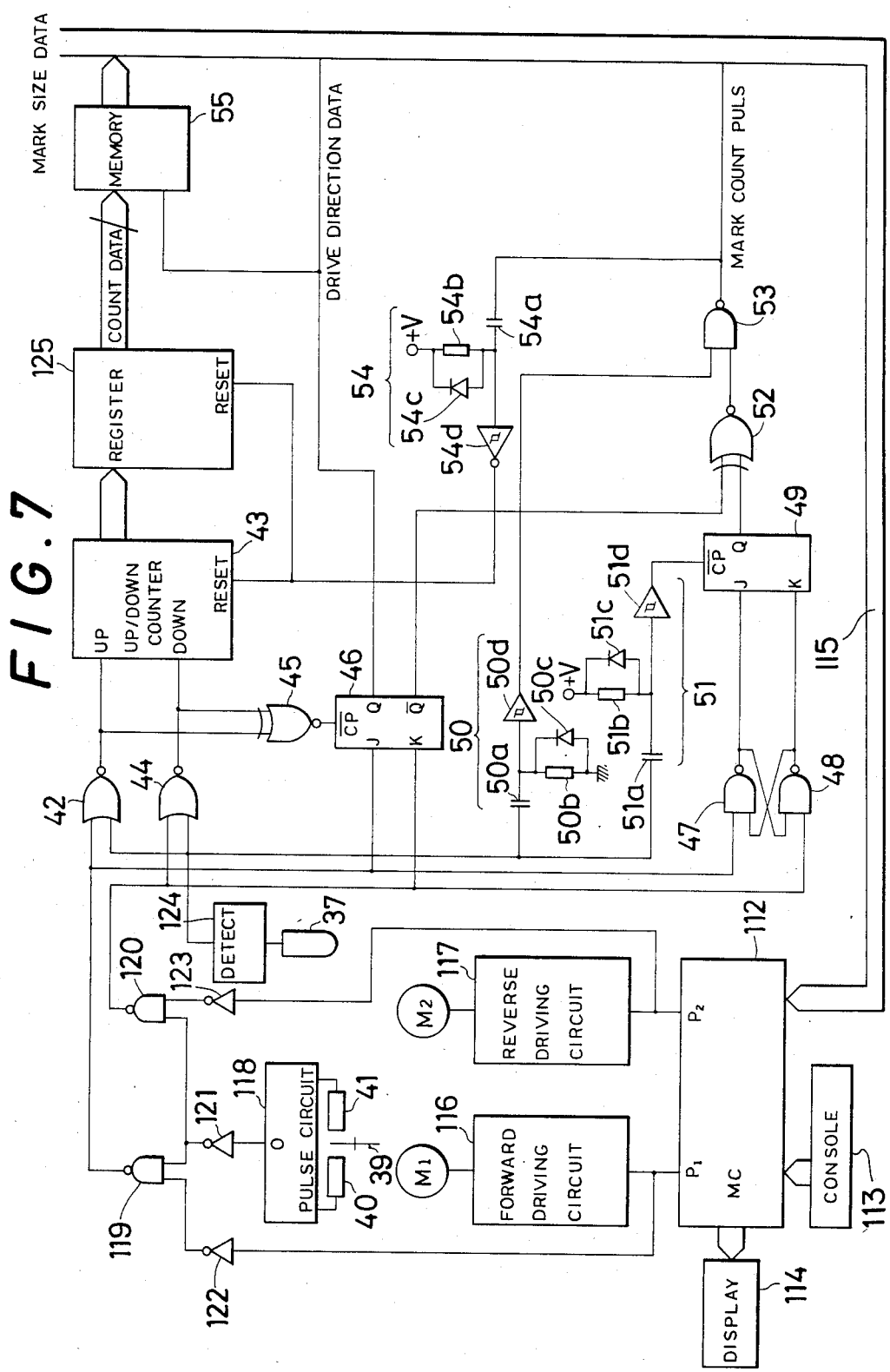
FIG. 7 is a circuit diagram showing the circuit construction of a signal processing section in the embodiment.

FIG. 7 shows a control circuit for the mark detecting apparatus for the micro-roll film, and in the drawing, there is shown a micro-computer 112 which is a center for the control, and to which a console 113 for applying mark detecting instructions thereto, a display unit 114 for displaying the state of the mark detection, and a bus line for taking in various data thereinto are connected while to the output ports P1 and P2 thereof, there are respectively connected a forward rotation driving circuit 116 for driving the take-up motor M1 and a reverse rotation driving circuit 117 for driving the rewinding motor M2. The micro-computer 112 referred to above is arranged to compare the mark detecting instruction input from the console 113, with the film mark detecting data input from the bus line 115, and to apply the motor driving signal to the forward rotation driving circuit 116 or reverse rotation driving circuit 117, and also to display the mark detecting instruction, state of the mark detection for the film, etc. on the display unit 114.

A pulse generating circuit 118 is adapted to produce pulses corresponding to the running of the film 35 by the pulse disc 39 referred to earlier and the set of the light emitting element 40 and light receiving element 41 confronting each other through said disc 39 for output from the output terminal O, which is connected to input terminals of NAND gates 119 and 120 through an inverter 121. The other input terminal of the NAND gate 119 is connected, through an inverter 122, to the output port P1 from which the forward rotation driving signal from the micro-computer 112 is output, while the other input terminal of the NAND gate 120 is connected, through an inverter 123, to the output port P2 from which the reverse rotation driving signal from the micro-computer 112 is produced.

Accordingly, based on the mark detecting instruction from the console 113, when the micro-computer 112 has produced the forward rotation driving signal "L" from the output port P1, the motor M1 is driven by being controlled by the forward rotation driving circuit so as to start the winding up of the film 35. Following this function, the pulse disc 39 connected to the driven roll 38 is rotated, thereby to generate pulses from the pulse generating circuit 118. The pulses produced from the output terminal O of the pulse generating circuit 118 are applied to the input terminal of the NAND gate 119 through the inverter 121, while similarly, the forward rotation driving signal "L" produced from the output port P1 of the micro-computer 112 is also input to the other input terminal of the NAND gate 119 through the inverter 122, and therefore, pulses corresponding to the winding up of the film (forward direction feeding) are produced from the above NAND gate 119.

On the other hand, when the micro-computer 112 has produced the reverse rotation driving signal "L" from the output port P2 based on the mark detecting instruction from the console 113, the motor M2 as controlled by the reverse rotation driving circuit is driven, and thus, the rewinding of the film 35 is started. Following the above function, the pulse generating circuit 118 produces pulses. These pulses are applied to the input terminal of the NAND gate 120 through the inverter 121, while the reverse rotation driving signal "L" produced from the output port P2 of the micro-computer 112 is also input to the other input terminal of the NAND gate 120 through the inverter 123, and therefore, the pulses corresponding to the rewinding (reverse direction feeding) of the film are produced from the above NAND gate 120.

In the manner as described above, the pulses produced at the pulse generating means are identified to be the forward direction pulses or reverse direction pulses, and in the case of the forward direction pulses, they are output from the NAND gate 119, while in the case of the reverse direction pulses, they are produced from the NAND gate 120.

The mark detecting circuit 124 is arranged to output the mark detecting signal "L" when the detecting element 37 is detecting the mark 36.

A NOR gate 42 receives the mark detection signal and the forward direction pulse, and produces a signal with a pulse waveform as shown in (c) of FIG. 8 only when both of said mark detection signal and forward direction pulse are of the L level. The above output signal is applied to a count up input terminal UP of an up/down counter 43 at a subsequent stage, whereby the up/down counter 43 continues to count the number of pulses of the forward direction pulse so long as the mark detection signal (L level) is being produced. Meanwhile, a NOR gate 44 receives the mark detection signal and the reverse direction pulse, and the output signal thereof is applied to a count down input terminal DOWN of the up/down counter 43, whereby the up/down counter 43 continues to count the number of pulses of the reverse direction pulses while the mark detection signal is being produced.

The output signals of the NOR gates 42 and 44 are separately applied to an EX-OR gate 45 respectively, and from this gate 45, a clock signal synchronized with either of the output signal of the NOR gate 42 or 44 is applied, through an inverter, to a JK flipflop 46 at a subsequent stage.

To the input terminals J and K of the JK flipflop 46, the forward direction pulse and the reverse direction pulse are respectively input, and when the film 35 is running in the forward direction, the non-inverting output Q thereof is maintained at H level, with the inverting output $\overline{Q}$ thereof being retained at L level. In the case where the film 35 is running in the reverse direction, the non-inverting output Q is maintained at L level, and its inverting output $\overline{Q}$ is retained at H level.

NAND gates 47 and 48 are adapted to constitute RS flipflops, and respectively applied with the forward direction pulse and reverse direction pulse so as to maintain the output state corresponding to running of the film 35 in the forward direction and reverse direction. These RS flipflops are connected to a JK flipflop 49 at a subsequent stage, and at this JK flipflop 49, an input J becomes H level upon output of the forward direction pulses, and an input K becomes H level when the reverse direction pulse is produced.

Numeral 50 represents a signal processing stage for detecting the rising or positive edge of the mark detection signal, and this signal processing section 50 includes a differentiation circuit portion constituted by a capacitor 50a, a pull-down resistor 50b, and inverse voltage protection diode 50c, and a Schmitt buffer 50d, and a signal of H level is produced at the rising or positive edge of the mark detection signal, that is, at the termination of the mark detection. On the contrary, a signal processing stage for detecting the falling or negative edge of the mark detection signal is denoted by Numeral 51, and comprises a differentiation circuit portion including a capacitor 51a, a pull-up resistor 51b and a diode 51c for protection against over-current, and a Schmitt buffer 51d, and a signal of L level is detected at the falling or negative edge of the mark detection signal, that is, at the starting of the mark detection. Thus, this output signal is input as a clock signal for the JK flipflop 49 described above. By the above function, for example, when the forward direction pulse is being output at the falling or negative edge of the mark detection signal, the input J of the JK flipflop 49 is at H level, and the input K thereof is at L level, and therefore, by the input of the above clock pulse, the output Q of the JK flipflop 49 is maintained at H level thereafter. Conversely, when the reverse direction pulse is output at the falling or negative edge of the mark detection signal, the output Q of the JK flipflop 49 thereafter maintained at L level.

The output Q of the JK flipflop 49 and the inverting output $\overline{Q}$ of the JK flipflop 46 are applied to an EX-OR gate 52 at a subsequent stage, and at this EX-OR gate 52, the output signal becomes H level only when the above two inputs are the same, i.e. only in the case where the running direction of the film 35 is the same after the falling or negative edge of the mark detection signal. Accordingly, at a NAND gate 53 at a subsequent stage where the output of the signal processing stage 50 for the detection of the rising or positive edge of the mark detection signal and the output of the EX-OR gate 52 are applied, an output signal of L level as shown at (d) of FIG. 8 is obtained only when the running direction of the film 35 is the same as the running direction at the falling or negative edge of the mark detection signal, at the time point for the rising or positive edge of said mark detection signal. This output signal of L level is taken out in the form of a mark count pulse corresponding to each frame 35a of the film 35.

The above mark count pulse is applied to a reset terminal RESET of the up/down counter 43 or a reset terminal RESET of a register 125 through another signal processing stage 54, which comprises a differentiation circuit portion including a capacitor 54a, a pull-up resistor 54b and a diode 54c for protection against overvoltage, and a Schmitt inverter buffer 54d, and by the output thereof, at the negative edge of the mark count pulse (shown at (d) in FIG. 8), i.e. at the positive edge (equivalent to a time point when the mark 36 completes to pass through the position of the photoelectric element 37) of the mark detection signal (shown at (b) in FIG. 8), the up/down counter 43 is reset.

The register 125 is intended to retain the count output signal of the up/down counter 43, and also, arranged to input the count output signal retained thereby at that time, to a memory 55 at a subsequent stage, when the mark count pulses referred to earlier are applied to the reset terminal RESET of the register 125.

The count data produced from the register 125 differs in the value according to the mark size for the large mark, medium mark or small mark, and therefore, in each address of the memory 55 corresponding to the count data, the mark size data corresponding to such count data value is stored.

Table 1 below shows one example of the mark size data stored in the respective addresses of the memory 55.

TABLE 1

| Address | Data | | |
|---|---|---|---|
| 0 0 0 0 | — | | |
| 0 0 0 1 | Small mark | (Standard) | Forward |
| 0 0 1 0 | Small mark | | direction |
| 0 0 1 1 | Medium mark | | (count up) |
| 0 1 0 0 | Medium mark | (Standard) | |
| 0 1 0 1 | Medium mark | | ↓ |
| 0 1 1 0 | Large mark | | ↓ |
| 0 1 1 1 | Large mark | (Standard) | ↓ |
| 1 0 0 0 | — | | |
| 1 0 0 1 | Large mark | (Standard) | ↑ Reverse |
| 1 0 1 0 | Large mark | | ↑ direction |
| 1 0 1 1 | Medium mark | | ↑ (count |
| 1 1 0 0 | Medium mark | (Standard) | down) |
| 1 1 0 1 | Medium mark | | |
| 1 1 1 0 | Small mark | | |
| 1 1 1 1 | Small mark | (Standard) | |

The count down of the up/down counter 43 is set at "0000" at the reset time, and in the case of the count up, the counting is started as it is from "0000", but for the count down, the setting is changed from the state "0000" to "1111", and thereafter, the counting is effected in such a manner as "1110"→"1101".... As is seen from Table 1, the addresses in the vicinity of the address as a standard for the respective marks are adapted to correspond to the same mark, so that the mark may be correctly detected even if there is a scattering or deviation in the count to a certain extent.

The non-inverting output Q of the JK flipflop 46 becomes H level when the running direction of the film 35 is in the forward direction, and L level when the running direction thereof is in the reverse direction, and therefore, this output is taken out as the data for the running direction.

Further, this non-inverting output Q is applied to the memory 55 to limit the addresses for the memory data to be read between 0000 and 0111 in the forward direction and between 1111 and 1000 in the reverse direction.

It is to be noted here that when the running direction of the film 35 is reversed in the course from the falling or negative edge of the mark detection signal to the rising or positive edge thereof, i.e. in the case where the film 35 is reversed in the running direction on the way where the mark 36 passes the installed position of the photoelectric element 37 and the mark 36 turns back halfway, the two inputs of the EX-OR gate 52 become the same, and the output signal thereof assumes L level, and thus, the NAND gate 53 at the subsequent stage does not produce the mark count pulses at the rising or positive edge of the mark detection signal, with the up/down counter 43 not being reset, but since the up count number and the down count number during this period become the same, the count data is returned to the state at the resetting.

The size data output from the above memory 55, the running direction data produced from the output Q of the JK flipflop 49, and the mark count pulses output from the NAND gate 53 are respectively taken into the microcomputer 112 through the bus line 115, so as to be used as the data for the film mark detection control by the micro-computer 112.

By the above arrangement according to the present invention as described so far, in this mark detecting apparatus, by employing only one photoelectric element 37 as a mark detecting element, it is possible to effect the detection (mark size data) of the plurality of kinds of marks 36 in different sizes on the film 35, and judgement as to whether the running direction of the film 35 is in the forward direction or in the reverse direction (running direction data), and also to obtain the mark count pulses corresponding to the respective frames 35a of the film 35.

Effect

According to the arrangement of the present invention as described so far, since there are provided to mark detecting element disposed in position where the marks pass, the pulse generating means for generating pulses associated with running of a micro-roll film, and the mark size judging means which counts the pulses generated from the pulse generating means while the mark detecting element is detecting the marks, and judges the sizes of the marks based on the counted value, it is possible to detect, through identification, the plurality of kinds of marks of different sizes on the film by employing only one mark detecting element. Accordingly, there are available such favorable effects that not only the number of the detecting elements is decreased for cost reduction, but also the work required for adjustments of the output performance of the mark detecting element may be reduced to a large extent through the decrease in the number of the detecting element.

What is claimed is:

1. A mark detecting apparatus for measuring lengths of indicator marks of different lengths provided on respective frames of an advancing micro-roll film comprising;

first means including a single photo responsive element sensing said indicator marks at a predetermined location for generating mark detecting signals of durations corresponding to the time of passage of respective marks past said location, second means for generating successive pulses corresponding to equal increment advances of the film, and third means for counting said pulses during the duration of respective mark detecting signals as indications of the lengths of respective marks.

2. A mark detecting apparatus as claimed in claim 1, wherein said second means further comprises a roller driven for rotation by contacting the film, a disc mounted on said roller and having a plurality of light transmitting portions provided at equal intervals on a circle, and a set of a light emitting element and a light receiving element provided to confront each other through said disc.

3. A mark detecting apparatus as claimed in claim 1, wherein said third means includes an up/down counter which starts count-up or count-down upon starting of the mark detection, and outputs the counted value, a register means which receives and registers the counted value from said counter and outputs the registered value upon termination of the mark detection, and a memory means whose memory contents are size data and which receives the registered value from said register as an address signal for outputting the memory contents of the equivalent address.

4. A mark detecting apparatus as claimed in claim 3, wherein said memory means has the size data for the same size in the memory contents of a plurality of addresses.

* * * * *